(12) United States Patent
Bull et al.

(10) Patent No.: US 6,530,841 B2
(45) Date of Patent: Mar. 11, 2003

(54) ELECTRONIC TAG GAME

(75) Inventors: Stephen M. Bull, New York, NY (US); Terese Svoboda, New York, NY (US)

(73) Assignee: Cutlass, Inc., New York, NY (US)

( * ) Notice: Subject to any disclaimer, the term of this patent is extended or adjusted under 35 U.S.C. 154(b) by 60 days.

(21) Appl. No.: 09/893,121

(22) Filed: Jun. 26, 2001

(65) Prior Publication Data

US 2002/0198055 A1 Dec. 26, 2002

(51) Int. Cl.[7] .................... A63F 13/00; G06F 17/00
(52) U.S. Cl. ........................................................ 463/42
(58) Field of Search ........................... 463/39, 40, 41, 463/42, 30, 31; 455/457

(56) References Cited

U.S. PATENT DOCUMENTS 4,296,930 A * 10/1981 Fredricksen ................. 273/313

2002/0111201 A1 * 8/2002 Lang ............................. 463/2

OTHER PUBLICATIONS

Mason et al.; "Active Games and Contests"; A. S. Barnes and Company; New York; pp. 250; Apr. 1940.

* cited by examiner

Primary Examiner—Thomas N. Moulis
(74) Attorney, Agent, or Firm—Bever, Hoffman & Harms, LLP; Jeanette S. Harms

(57) ABSTRACT

A game of tag using wireless devices is disclosed. In one embodiment of the present invention, players in a game space are each assigned a player to tag and assigned to another player to be tagged. Thus, each player is both "it" (trying to tag a target player) and a target (trying to evade being tagged). Interaction among players is conducted via wireless device.

50 Claims, 3 Drawing Sheets

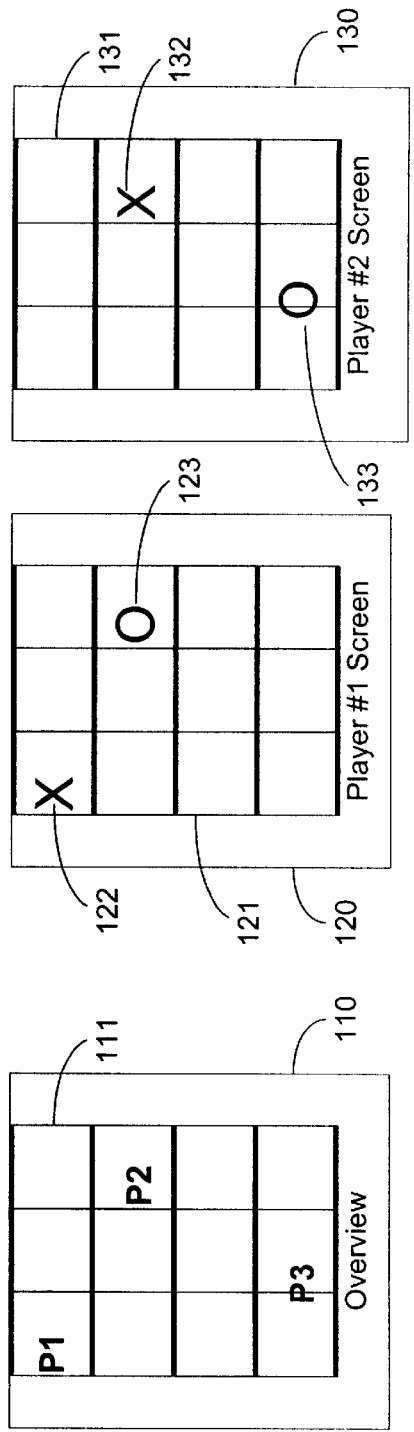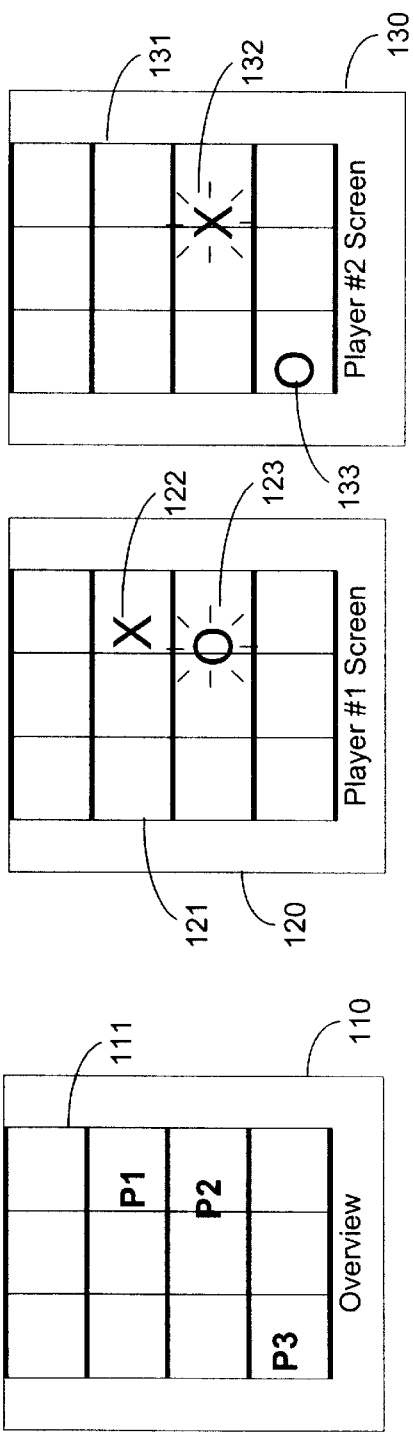

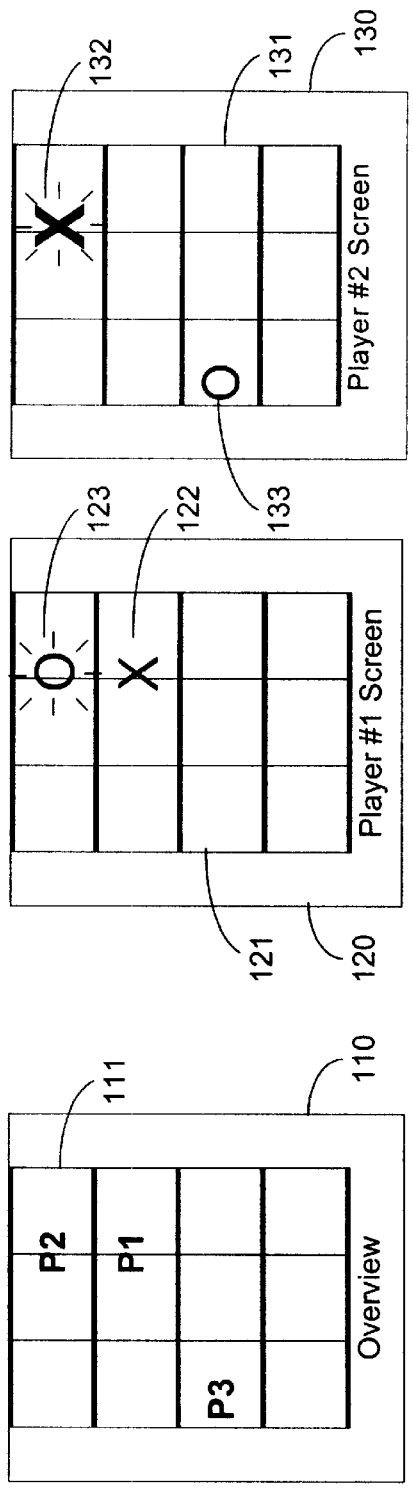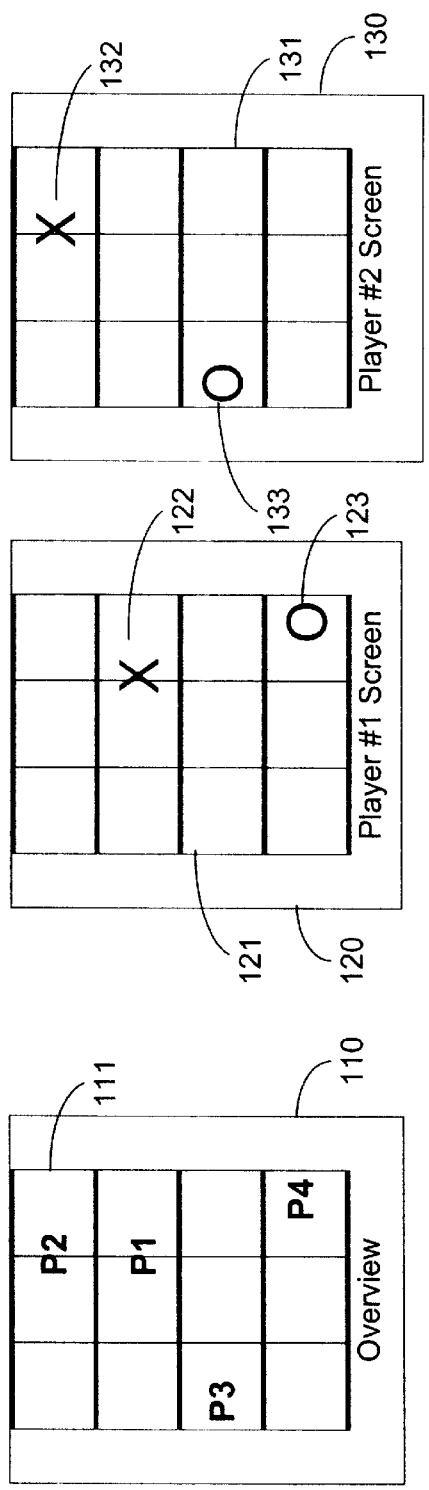

ELECTRONIC TAG GAME

FIELD OF THE INVENTION

The present invention relates to electronic games. More specifically, the present invention relates to an electronic game of tag using wireless devices.

BACKGROUND OF THE INVENTION

The children's game of tag has many variations. Typically one player is designated "it" and must find and tag another player. Once tagged, the new player becomes it. Methods of tagging vary amongst tag games. For example, Shadow Tag is played with the "it" player tagging another player not by touching them, but by stepping on their shadow. (See, Chapter 28, "Tag Games" in *Active Games and Contests* by Bernard S. Mason, Ph.D. and Elmer D. Mitchell, Ph.D., A. S. Barnes and Company, New York, Copyright 1935, Twelfth Printing.)

Two successful real time contemporary tag games include Paint Ball and Laser Tag. Paint Ball players shoot non-toxic exploding paintballs at opposing players to record hits. Players or teams may use color-coded paint to register credit for hits. These paintballs leave a tag mark on their opponents, sometimes damaging clothing or even leaving welts on the skin of the tagged players. Therefore, Paint Ball can involve highly undesirable physical contact even in a "game" environment. Laser Tag solves the undesirable contact problem in Paint Ball. Specifically, in Laser Tag, players wear special equipment consisting of three pieces: a shooting or tagging device (e.g. a gun), a receiving sensor that is worn over the player's clothing and records another player's tag of him, and a computer pack including a battery pack and micro-processor that tallies the hits and wounds. Each weapon may be coupled to the damage inflicted by that weapon for scorekeeping purposes. Laser Tag has two modes of play. In one mode, one team plays against at least one other team and the team with the highest number of hits on the other team's sensors create a win. The other mode of Laser Tag play is a free-for-all version where a single player with the most hits on the sensors of the other player (hits) and the least hits on the player's own sensors (wounds) wins. In arcades that have laser tag rooms, the information from the computer pack is wirelessly downloaded onto a score server, which then prints out the score for all the players at the end of the session. Although Laser Tag eliminates undesirable contact during the game, it requires special equipment that is not typically used in public spaces.

Another form of modern tag closely resembles a "hide-and-seek" game, which can be played in public spaces. In these games, one or more "hiding" players perform tasks in a given space and "seeking" players attempt to tag them during the performance of these tasks. For example, the RUNNER, an American reality TV series, is, in part, a computer and Internet mediated game where viewers and Internet players are given clues to pursue and tag an individual who is trying to cross the country from West to East without detection. Another game, HIDE/SEEK played in New York City, December, 2000, required hiding players to perform tasks in a public place. The locations of these tasks were also broadcast over the Internet so that seeking players (anyone on the Internet or in the general location of the task with or without a cell phone) would have a chance to locate them, tag them and collect a reward. Unfortunately, these types of games distinguish players as either "it" (e.g. the players performing the tasks and being targeted by the seeking players) or as players seeking the it players. Similarly, these types of games run for a specified period of time and then end, requiring players to adjust their schedules to play the game. It would be desirable to have a game of tag that allows all players to tag and be tagged. It would additionally be desirable to have an ongoing game, rather than a game that is played for only a limited time.

SUMMARY

Accordingly, a wireless device-enabled tag game is presented. The game allows players to find and tag each other with their wireless devices. When one player's device is in close proximity to the device of another player, the tag is enabled by the wireless devices, thereby eliminating the need for physical contact to make the tag. The wireless device of either player can display the status and results of the game. Because the game can be defined in a particular space and can include anyone with an appropriate wireless device, the game may remain ongoing such that players may join and part at will without greatly affecting the game.

The present invention will be more fully understood in view of the following description and drawings.

BRIEF DESCRIPTION OF THE DRAWINGS

FIGS. 1A, 1B, and 1C are screen displays of a portion of the tag game at a first time according to an embodiment of the present invention.

FIGS. 2A, 2B, and 2C are screen displays of a portion of the tag game at a second time.

FIGS. 3A, 3B, and 3C are screen displays of a portion of the tag game at a third time.

FIGS. 4A, 4B, and 4C are screen displays of a portion of the tag game at a fourth time.

Similar elements in Figures are labeled similarly.

DETAILED DESCRIPTION

Figure 5:
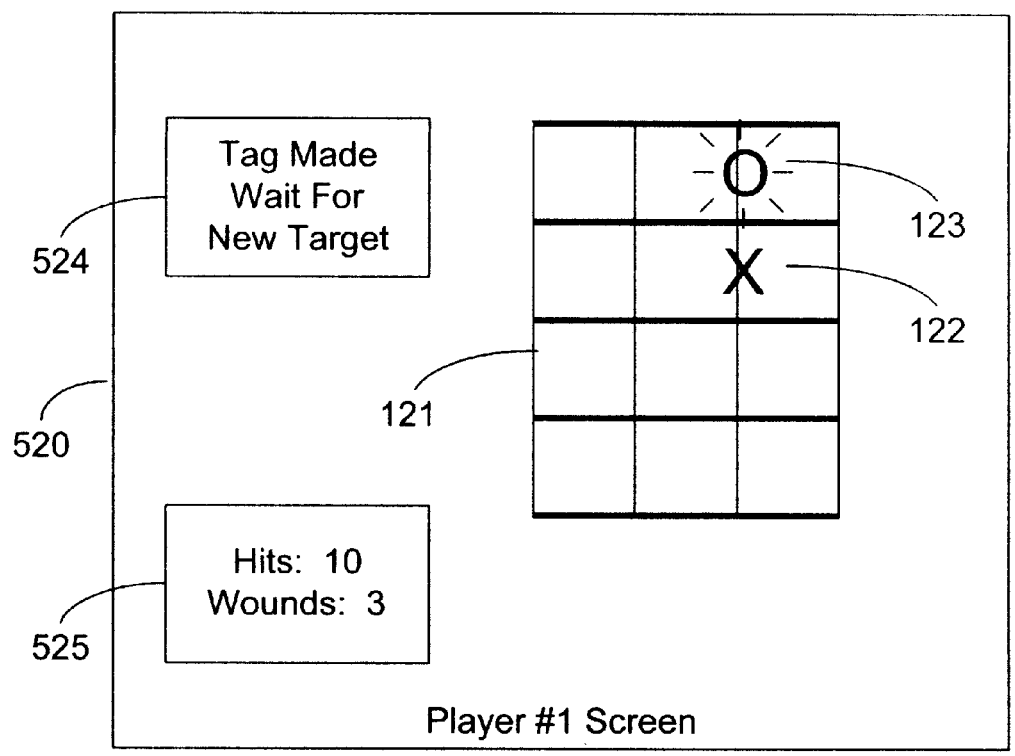
FIG. 5 is a screen display of a portion of the tag game in accordance with another embodiment of the present invention.

In a first embodiment, each player located within a playing area is assigned a target, wherein the target is another player located in the entertainment space (playing area) that is also playing the game. Each player has a display screen provided via a wireless device (e.g. a cell phone) showing the relative position of himself/herself and the player's current target. The object of the game is to track the target and tag the target. Once a successful tag has been made by the player, that player is assigned a new target with the assignment to track and tag that new target.

In accordance with one feature of the invention, while a player is tracking a target, that player can be a target of another player. Thus, each player is simultaneously both maneuvering to tag their target and maneuvering to evade the tag of another player. In other words, each player is both "it" (having the goal of finding another designated player to tag) and the target of an "it" (the player assigned to target them), assuming there are more than two players in the playing area. Players can keep track of the relative position between themselves and their targets, but not the position of other players. Thus, the target has no information about the pursuing player.

The tagging process uses a wireless device to make a tag. In one embodiment, a tag is made on a controlling device server when two wireless devices are within a certain range (e.g. 10 feet) of each other for a certain period of time (e.g. 2 minutes). In another embodiment, the wireless devices communicate directly in a peer-to-peer fashion to complete tags. In one embodiment, wireless communication is via bluetooth. In another embodiment, wireless communication is via radio frequency signal.

While many players may be involved in the game play within the designated game space, each player is an "it" only to one other player at a time. In one embodiment, once a first player has tagged a target, that first player may not tag that same target again. In another embodiment, the game controller may allow a tagged player to become the "it" player for a tag back after a two-minute interval. A tag-back is a situation that occurs when a tagged target player receives the former pursuing player as a new target and tags that person.

In one embodiment, while there may be many players engaged in the game within the same playing area, each player's wireless device user interaction screen (screen display) shows a north/south grid with two icons displayed. One icon represents the player and the other icon represents the target. Other embodiments represent other game areas, such as a map of city streets, a floor plan of a shopping mall, or a nature park with indications of prominent park landmarks. In one embodiment, the scale of the grid changes with proximity to the target.

The goal of a player in this embodiment of the present invention is to get the highest score. The total score is calculated by taking the number of a player's tags earned and subtracting the number of tags lost. When a first player tags a target, the first player has their "tags earned" score increased by one. Thus, tagging the appropriate player increases the player's score. When a target is tagged by a pursuing player, the target has his/her "tags lost" score decreased by one, producing a negative number. Thus, being tagged decreases the player's total score.

Sound may also be used to assist in range detection of a target player. For example, in one embodiment, entering tagging range of a target player is indicated by a beep. In another embodiment, the countdown of the tagging process is accompanied by beeps of increasing frequency. In a variation of this embodiment, voice queues count down the tagging process and notify the player at the completion of the tag.

Different strategies may be employed in differing embodiments of the present invention. For example, in one embodiment, the tag game is shown to spectators that in turn may send messages to players during the game. Players must decide whether to trust the messages (e.g. from a spectator supporting the player) or distrust the messages (e.g. from a spectator supporting another player). In a variation of this embodiment, players may also message each other. In one embodiment, spectators have access to an overview of the tag game play, and can see the relative locations of all players.

FIG. 1A is an overview screen display 110 of a tag game in progress at a first time. In one embodiment, this overview screen is not seen. In another embodiment, this overview screen is seen by a metaplayer that coordinates the game. The overview screen 110 represents the playing area (or a subset of the playing area) in which the game takes place. A grid 111 divides the playing area into a series of blocks. In one embodiment, the blocks of grid 111 are divided into four rows and three columns. Displayed on grid 111 are the relative locations of players P1, P2, and P3 at one point in time. In this playing area, player P1 is located in the first block at the first row and first column, player P2 is located in the second block at the second row and third column, and player P3 is located between blocks at the fourth row and first/second columns.

FIG. 1B is a screen display 120 as seen by player P1 at the first time. Each player's own position is marked by an "X" on his/her own display screen, whereas a target's position is marked by an "O". Thus, an "X" 122 is placed in the block at the first row and first column of a grid 121 to represent the position of player P1. In one embodiment, grid 121 aligns with grid 111 (FIG. 1A). Player P1 is assigned player P2 as a target. Thus, an "O" 123 is placed in the block at the second row and third column to represent the position of player P2. As a result, screen display 120 shows player P1 that the relative position of the target player is two blocks over and one block down. In one embodiment, the positions of icons are updated continuously. In another embodiment, the icons are updated sporadically (e.g. updated every 3–4 seconds) to heighten excitement and possibly handicap players.

FIG. 1C is a screen display 130 as seen by player P2 at the first time. Thus, an "X" 132 is placed in the block at the second row and third column of a grid 131 to represent the position of player P2. In one embodiment, grid 131 aligns with grid 121 and grid 111. Note that when grids 121 and 131 align, "O" 123 and "X" 132 are co-located, thereby distinguishing player P2 as the target on screen display 120 and the "it" player on screen display 130. Player P2 is assigned player P3 as a target. Thus, an "O" 133 is placed in the block at the fourth row between the first and second columns to represent the position of player P3. As a result, screen display 130 shows player P2 that the relative position of the target player is one block over and two blocks down. Note that while player P2 is being pursued by player P1, the location of player P1 does not show up on screen display 130.

FIG. 2A is an overview screen display 110 of a tag game in progress at a second time. The second time occurs some amount of time after the first time. Player P1 is now located in the second row and second column, player P2 has moved to the third row in the third column, and player P3 is located in the fourth row in the fourth column.

FIG. 2B is a screen display 120 as seen by player P1 at the second time. The "X" 122 corresponding to the position of player P2 in FIG. 2A is placed in the second row and second column. Player P2, the target of player P1, has the "O" 123 moved to the third row between the second and third column. The lines surrounding the "O" 123 indicate a blinking symbol. In this embodiment, this blinking symbol indicates that a target is in range of a targeting player for the tag. Other embodiments indicate range in other ways and may use a blinking symbol to mean other things. In one embodiment, a tag occurs when the pursuing player keeps the target player within close range for approximately two minutes. It is possible, then, that a pursuing player may not realize which of a number of persons within view is the target. Screen display 120 shows player P1 that the relative position of the target is one block down and that player P2 is in range to be tagged.

FIG. 2C is a screen display 130 as seen by player P2 at the second time. The "X" 132 corresponding to the position of player P2 is located to the third row between the second and third column as shown. The lines surrounding the "X" 132 again indicate a blinking symbol. In this embodiment the blinking "X" 132 indicates to player P2 that player P2 is within range of the "it" player. In one embodiment, the blinking "X" 132 indicates to player P2 that player P2 has two minutes to get out of range of the pursuing player or player P2 will be tagged. The position of the target of player P2, player P3, the "O" 133, is placed in the fourth row and the first column. As a result, screen display 130 shows player P2 that the relative position of the target player is one and a half blocks over and one block down, as well as indicating that player P2 is in range of being tagged by another player. Again, although player P2 is being pursued by player P1, the location of player P1 does not show up on screen display 130.

FIG. 3A is an overview screen display 110 of a tag game in progress at a third time. The third time occurs some amount of time after the second time. Player P1 is still located near the second row and second column, player P2 has moved to the first row between the second and third column, and player P3 is located in the third row in the first column.

FIG. 3B is a screen display 120 as seen by player P1 at the third time. The "X" 122 corresponding to the position of player P2 in FIG. 2A is placed in the second row and between the second and third columns. Player P2, the target of player P1, has the "O" 123 moved to the first row between the second and third columns. Note that the "O" 123 is blinking. As a result, screen display 120 shows player P1 that the relative position of the target player is one block up and that player P2 is in range to be tagged. A successful tag may be displayed to player P1 by altering the icon of the target player, playing a sound, displaying a text message, or other means. In this embodiment, a message stating that the tag is successful is displayed along with a message to wait for a new target icon to appear.

FIG. 3C is a screen display 130 as seen by player P2 at the third time. The "X" 132 corresponding to the position of player P2 is located to the first row between the second and third columns as shown. The bolding of the blinking "X" 132 indicates to player P2 that he/she has just been tagged. Other embodiments use other methods to indicate a tag. Although player P2 has been tagged, player P2 is still targeting player P3. The position of target player P3, the "O" 133, is placed in the third row and the first column. As a result, screen display 130 shows player P2 that the relative position of the target player is one and a half blocks over and two blocks down, as well as indicating that player P2 has just been tagged by another player.

FIG. 4A is an overview screen display 110 of a tag game in progress at a fourth time. The fourth time occurs some amount of time after the third time. Player P1 is still located in the second row and between second and third columns. Player P2 is located in the first row between the second and third columns. Because player P2 has been tagged by player P1, player P2 no longer appears on the screen display of player P1 and player P2 has been assigned as a new target for another player (not shown). Player P3 is located in the third row and the first column. Because player P1 has tagged the original target, player P2, player P1 has been assigned a new target, player P4. Player P4 is located in the third row and the fourth column.

FIG. 4B is a screen display 120 as seen by player P1 at the fourth time. The "X" 122 corresponding to the position of player P1 in FIG. 4A is placed in the second row and between the second and third columns. Player P4, the new target of player P1, has the "O" 123 located in the fourth row and the third column. As a result, screen display 120 shows player P1 that the relative position of the target player is one half block over and two blocks down.

FIG. 4C is a screen display 130 as seen by player P2 at the fourth time. The "X" 132 corresponding to the position of player P2 is located to the first row between the second and third columns as shown. The lack of a bold or blinking "X" 132 indicates that player P2 is neither in range nor has been tagged by the pursuing player. Player P2 is still targeting player P3. The position of target player P3, the "O" 133, is placed in the third row and the first column. As a result, screen display 130 shows player P2 that the relative position of the target player is one and a half blocks over and two blocks down.

FIG. 5 is a screen display 520 as seen by player P1 at the third time in accordance with another embodiment of the present invention. Similar to FIG. 3B, screen display 520 has grid 121, which shows the relative positions of player P1 as an "X" 122 and player P2 as an "O" 123. Screen display 520 additionally displays a message box 524 that informs player P1 that a tag has been made and that player P1 should wait for a new target. A status box 525 keeps track of player's hits and wounds.

Figure 6:
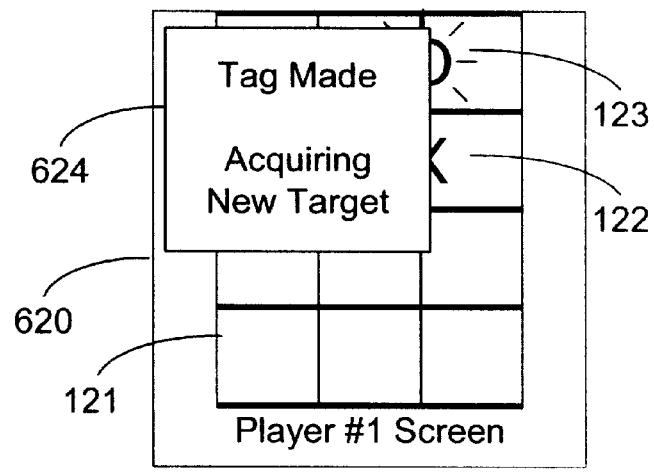
FIG. 6 is a screen display of a portion of the tag game in accordance with another embodiment of the present invention.

FIG. 6 is a screen display 620 as seen by player P1 at the third time in accordance with another embodiment of the present invention. Similar to FIG. 3B, screen display 620 has grid 121, which shows the relative positions of player P1 as an "X" 122 and player P2 as an "O" 123. Screen display 620 additionally displays a message box 624 that informs player P1 that a tag has been made and that player P1 should wait while a new target is acquired.

Additional or different rules governing play may be defined. For example, any player that attempts to prevent a tag by turning off the wireless device or otherwise ending communication during the game is eliminated from the game. Game play continues for a particular amount of time. All players' scores may be posted and available on the wireless device screen (as well as on the Internet) for review. Games may be played one after another, and a player may be asked via their wireless device at the end of a game whether they want to play again. Game funding may be provided by player subscription to a game service, product placement, and promotional marketing. In one embodiment, players entering a game area (adventure zone) where such a game is to be played are notified on their wireless devices that a tag game is in progress or is about to begin.

In the various embodiments of this invention, novel methods have been described for the wireless interaction of players in the game of tag. By facilitating game play with the use of wireless devices, strangers may come together and play. The various embodiments of the methods of this invention that are described above are illustrative only of the principles of this invention and are not intended to limit the scope of the invention to the particular embodiments described. For example, in view of this disclosure, those skilled in the art can define other electronic devices, game servers, game rules, and so forth, and use these alternative features to create a method or system according to the principles of this invention. Thus, the invention is limited only by the following claims.

What is claimed is:

1. A system for playing a game of tag, comprising:
   a first wireless device configured to accept:
      information related to a location of the first wireless device, and
      information related to a location of a second wireless device; and configured to display:
- a representation of an entertainment space in which the game of tag takes place,
- a first icon representing the location of the first wireless device relative to the entertainment space, and
- a second icon representing the location of the second wireless device relative to the entertainment space.

2. The system of claim 1, the configuration of the first wireless device incorporating a peer-to-peer configuration.

3. The system of claim 1, the configuration of the first wireless device incorporating a bluetooth configuration.

4. The system of claim 1, the configuration of the first wireless device incorporating a radio frequency configuration.

5. The system of claim 1, the first wireless device further configured to display information indicating that the location of the second wireless device is within a tagging distance of the location of the first wireless device.

6. The system of claim 5, wherein the information indicating that the location of the second wireless device is within the tagging distance of the location of the first wireless device is indicated on the first wireless device by the second icon blinking.

7. The system of claim 5, wherein the information indicating that the location of the second wireless device is within the tagging distance of the location of the first wireless device is indicated on the first wireless device by the second icon changing shape after a tagging amount of time.

8. The system of claim 5, wherein the information indicating that the location of the second wireless device is within the tagging distance of the location of the first wireless device is indicated on the first wireless device by the second icon blinking after a tagging amount of time.

9. The system of claim 5, wherein the information indicating that the location of the second wireless device is within the tagging distance of the location of the first wireless device is indicated on the first wireless device by the second icon changing shape.

10. The system of claim 5, wherein the information indicating the location of the second wireless device is within the tagging distance of the first wireless device is indicated by distinctive sound.

11. The system of claim 1, wherein the location of the first icon and the second icon displayed on the first wireless device are updated as the first wireless device and the second wireless device are moved into different positions.

12. The system of claim 1, wherein the location of the first icon and the second icon displayed on the first wireless device are indicated by distinctive sound.

13. The system of claim 1, the second wireless device configured to accept:
- information related to the location of the second wireless device, and
- information related to the location of a third wireless device; and configured to display:
- the representation of the entertainment space in which the game of tag takes place,
- a third icon representing the location of the second wireless device relative to the entertainment space, and
- a fourth icon representing the location of the third wireless device relative to the entertainment space.

14. The system of claim 13, the second wireless device further configured to display information indicating that the location of the second wireless device is within a tagging distance of the location of the first wireless device.

15. The system of claim 14, wherein the information indicating that the location of the second wireless device is within the tagging distance of the location of the first wireless device is indicated on the second wireless device by the third icon changing shape after a tagging amount of time.

16. The system of claim 14, wherein the information indicating that the location of the second wireless device is within the tagging distance of the location of the first wireless device is indicated on the second wireless device by the third icon blinking after a tagging amount of time.

17. The system of claim 14, wherein the information indicating that the location of the second wireless device is within the tagging distance of the location of the first wireless device is indicated on the second wireless device by the third icon changing shape.

18. The system of claim 14, wherein the information indicating that the location of the second wireless device is within the tagging distance of the location of the first wireless device is indicated on the second wireless device by sound.

19. The system of claim 13, wherein the location of the fourth icon represents a location of a third wireless device.

20. The system of claim 13, further comprising:
an overview screen configured to display:
- the representation of the entertainment space in which the game of tag takes place,
- the first icon representing the location of the first wireless device relative to the entertainment space,
- the second icon representing the location of the second wireless device relative to the entertainment space, and
- the third icon representing the location of the third wireless device relative to the entertainment space.

21. The system of claim 20, wherein the overview screen is viewed by game organizers to run the game.

22. The system of claim 20, wherein the overview screen is viewed by non-players to view game progress.

23. The system of claim 1, wherein the first wireless device is further configured to accept a message.

24. The system of claim 23, wherein the message is from the second player misleading the first player.

25. The system of claim 23, wherein the message is from onlookers giving hints for evading a tag.

26. The system of claim 23, wherein the message is from onlookers giving hints for making a tag.

27. A tag game system comprising:
a first wireless device including a display screen, the first wireless device configured to display:
- a first icon representing a location of the first wireless device, and
- a second icon representing a location of a second wireless device; and the second wireless device including a display screen, the second wireless device configured to display:
- a third icon representing the location of the second wireless device, and
- a fourth icon representing a location of a third wireless device.

28. The tag game system of claim 27, further comprising a controlling device configured to transmit information to the first wireless device defining the location of the first wireless device and the location of the second wireless device and configured to transmit information to the second wireless device defining the location of the second wireless device and a third wireless device.

29. The tag game system of claim 28, the controlling device further configured to transmit information relating to the proximity of the first wireless device and the second wireless device.

30. The tag game system of claim 28, the controlling device further configured to transmit information relating to the duration of time in which the first wireless device and the second wireless device are within a first distance of each other.

31. The tag game system of claim 28, the controlling device further configured to transmit information relating to a tagged state of the second wireless device.

32. The tag game system of claim 28, wherein the controlling device is wireless.

33. The tag game system of claim 27, wherein the first wireless device is configured to receive information related to a proximity of the second wireless device when the second wireless device is a first distance from the first wireless device.

34. The tag game system of claim 27, wherein the first wireless device is configured to receive information related to a tagged state of the second wireless device.

35. A method of playing tag, comprising:

assigning a first player to be a first tracker;

assigning a second player to be a first target to the first player, such that the first player tracks the second player via a first wireless device with the object to tag the second player;

assigning the second player to be a second tracker; and assigning a third player to be a second target to the second player, such that the second player tracks the third player via a second wireless device with the object to tag the third player; wherein an object of the game is for the second player to tag the third player while avoiding being tagged by the first player.

36. The method of claim 35, wherein the first player tags the second player by maintaining less than a first distance from the second player for a first period of time.

37. The method of claim 35, wherein the first player tags the second player by meeting the second player.

38. The method of claim 35, wherein a location of the second player relative to a location of the first player is displayed on the first wireless device.

39. The method of claim 38, wherein a location of the third player relative to the location of the second player is displayed on the second wireless device.

40. The method of claim 35, wherein the first wireless device alters a display when the second player is less than a first distance from the first player for a first period of time.

41. The method of claim 35, wherein the first wireless device alters a display when the second player is tagged by the first player.

42. The method of claim 35, wherein the second wireless device alters a display when the second player is tagged by the first player.

43. The method of claim 42, wherein the second wireless device alters a display when the third player is tagged by the second player.

44. The method of claim 35, further comprising assigning a fourth player to be a third target to the first player after the first player has tagged the second player, such that the first player tracks the fourth player via the first wireless device with the object to tag the fourth player.

45. The method of claim 35, wherein the first player enters the game after the game has started.

46. The method of claim 35, wherein the game begins at noon.

47. The method of claim 46, wherein the game is played daily.

48. The method of claim 35, wherein the game ends at five p.m.

49. The method of claim 35, further comprising removing the first player from game play when the first player violates a rule of the game.

50. The method of claim 49, wherein removing the first player is accomplished by notifying the first player.

* * * * *

UNITED STATES PATENT AND TRADEMARK OFFICE
CERTIFICATE OF CORRECTION

PATENT NO. : 6,530,841 B2
DATED : March 11, 2003
INVENTOR(S) : Stephen M. Bull

It is certified that error appears in the above-identified patent and that said Letters Patent is hereby corrected as shown below:

Column 1,
Line 55, "an" should be changed to -- a planned --.
Line 59, "HIDE/SEEK" should be changed to -- Hide/Seek/NYC --.

Column 4,
Line 48, "P2" should be changed to -- P1 --.

Column 5,
Line 23, "P2" should be changed to -- P1 --.

Signed and Sealed this

Twenty-ninth Day of June, 2004

JON W. DUDAS
*Acting Director of the United States Patent and Trademark Office*